United States Patent [19]

Bloom

[11] 4,223,983
[45] Sep. 23, 1980

[54] WIDE ANGLE MIRROR ATTACHMENT FOR VEHICLE SIDE VIEW MIRRORS

[75] Inventor: Stephen R. Bloom, Bloomfield Hills, Mich.

[73] Assignee: Perfection Automotive Products Corporation, Livonia, Mich.

[21] Appl. No.: 78,263

[22] Filed: Sep. 24, 1979

[51] Int. Cl.³ .................................................. G02B 5/10
[52] U.S. Cl. ..................................... 350/303; 350/293
[58] Field of Search ................................. 350/293, 303

[56] References Cited

U.S. PATENT DOCUMENTS

| 3,104,274 | 9/1963 | King | 350/293 |
| 3,131,250 | 4/1964 | Ely | 350/303 |
| 3,972,601 | 8/1976 | Johnson | 350/303 |

FOREIGN PATENT DOCUMENTS 2425502  12/1975  Fed. Rep. of Germany ........... 350/303

Primary Examiner—F. L. Evans
Attorney, Agent, or Firm—Cullen, Sloman, Cantor, Grauer, Scott & Rutherford

[57] ABSTRACT

A small, wide angle mirror, for application upon a conventional vehicle side view mirror surface, formed of a molded plastic, generally wedge-shaped, box having integral walls and a curved base which is mirrored. The box is closed with a separate, flat plate which is frictionally secured within the box and is spaced a short distance inwardly of the free edges of the box walls. A resilient pad is adhesively secured to the exposed surface of the plate and is partially concealed within the box and partially extends outwardly of the plane of the free edges of the walls. A pressure sensitive adhesive coating upon the pad secures the pad to the vehicle side view mirror surface for thereby fastening the mirror attachment in place.

4 Claims, 6 Drawing Figures

U.S. Patent  Sep. 23, 1980  4,223,983
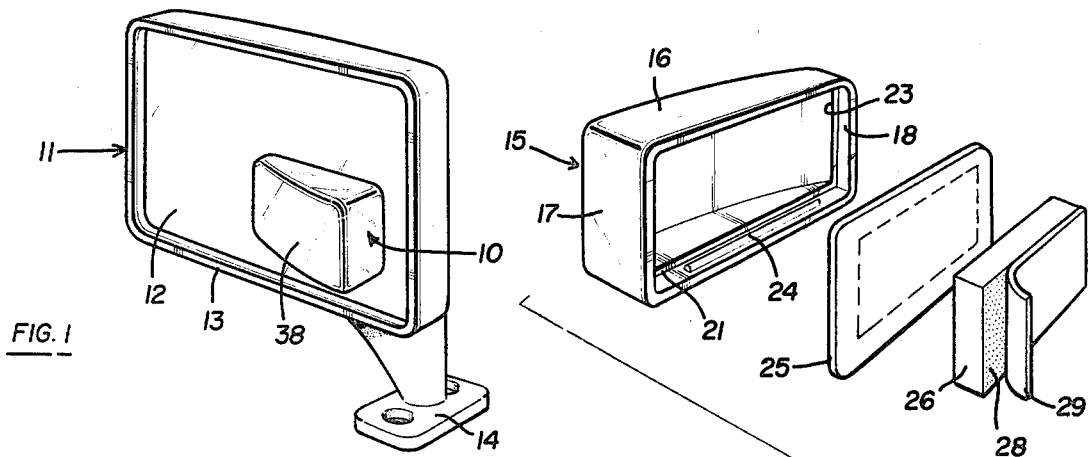
FIG. 1
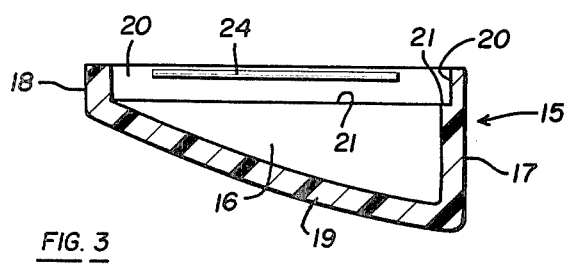
FIG. 2
FIG. 3
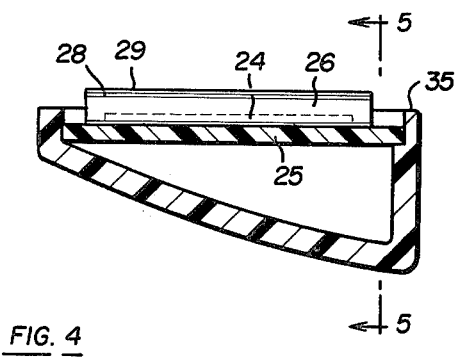
FIG. 4
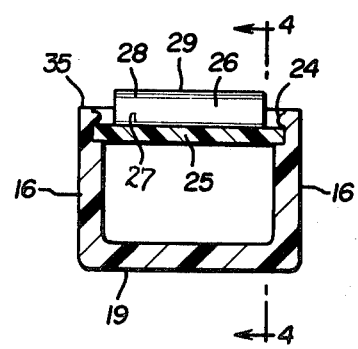
FIG. 5
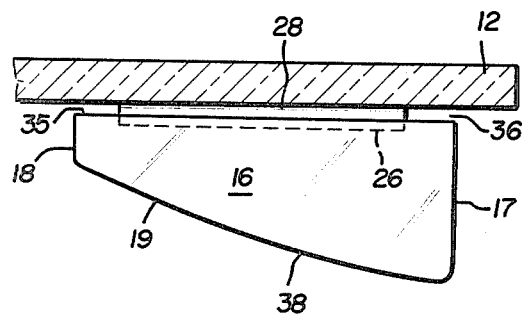
FIG. 6

WIDE ANGLE MIRROR ATTACHMENT FOR VEHICLE SIDE VIEW MIRRORS

BACKGROUND OF INVENTION

Conventional automotive side view mirrors, which are located on the driver's side of the vehicle, give the driver a reflective image of the area to the side and rearwardly of the vehicle. However, conventional mirrors normally have a blind spot or a blind area, namely, the area close to and at the rear part of the vehicle. Commonly, the driver of a vehicle is unable to see another vehicle located in the blind area so that many accidents are caused because the driver is unaware of the nearness of another vehicle.

In order to solve the problem of the blind area in the side view mirror, various types of wide angle mirrors have been developed, including small attachments which may be fastened upon the larger side view mirror. These attachments typically are sufficiently curved to give a wide angle reflection of the area immediately to the side and rear of the vehicle and consequently substantially eliminate the blind spot.

Small wide angle mirror attachments are typically provided as an after-market product, that is, a product purchased by a vehicle owner and applied to the side view mirror by himself. Consequently, it is desirable that the wide angle mirror attachment be of as low a cost as possible and as simple to install as possible. Moreover, since the mirror is subject to considerable vibration, it is desirable to attach the wide angle mirror to the automotive side view mirror in a manner which tends to resist the vibration, and also the effects of weather, so as to maintain it in place.

Thus, although the wide angle mirror attachment itself is generally known, the invention herein relates to a specific structural form which provides an improved manner of fastening the attachment in place so as to simplify the expense and the installation as well as to protect the connection between the attachment and the vehicle mirror.

SUMMARY OF INVENTION

The invention herein relates to forming the wide angle mirror as a wedge-shaped box having integral side and end walls and an integral curved base which forms the reflective surface, and a removable cover plate which closes the box and fastens it upon the surface of a side view mirror. The box is provided with interior shoulders or ledges and flanges for snap fitting and frictionally holding the plate within the box, below the surface of the free edges of the box. A resilient pad, such as of foam plastic, having pressure sensitive adhesive thereon, is fastened to the plate and extends outwardly of the plane of the free edges of the box so that the box can be pressure applied to and adhesively fastened upon the side view mirror surface. Consequently, the resilient pad is substantially concealed within the box and its connection to the plate is protected against weathering elements, while at the same time the pad is free to absorb vehicle vibrations.

Summarizing, an object of the invention is to provide a wedge-like wide angle mirror, which shape is old, but with a mounting plate fastening arrangement formed to protect and maintain the fastening between the plate and the side view mirror. Moreover, because the mirror body is in the shape of a complete, integral box, its outer surface can be completely mirrored by suitable mirror-forming coatings which are commercially available. Thus, from all directions, the mirror is esthetically pleasing in appearance, and produces a maximum reflectiveness.

Other objects and advantages of this invention will become apparent upon reading the following description, of which the attached drawings form a part.

DESCRIPTION OF DRAWINGS

FIG. 1 is a perspective view of a typical automobile side view mirror with the wide angle mirror attachment secured thereon.

FIG. 2 is a perspective, disassembled view, of the parts forming the wide angle mirror.

FIG. 3 is a cross-sectional plan view of the box-like body of the mirror.

FIG. 4 is a view, in cross-section, similar to FIG. 4, taken in the direction of arrows 4—4 of FIG. 5, and showing the cover plate assembled to the mirror body.

FIG. 5 is a cross-sectional, end view taken in the direction of arrows 5—5 of FIG. 4.

FIG. 6 is a plan view of the mirror attachment fastened upon a side view mirror.

DETAILED DESCRIPTION

FIG. 1 illustrates the wide angle mirror attachment 10 fastened upon a typical automobile side view mirror 11. Automotive side view mirrors come in various shapes, including circular, oval, rectangular, etc. The mirror shown here is illustrative of a typical mirror which generally is formed of a mirrored glass 12 fitted within a frame 13 that is connected to the vehicle by means of a suitable fastening bracket 14. Preferably, the wide angle mirror attachment is located at the lower right-hand corner of such type mirror, that is, near the driver's side of the mirror so as to give the maximum coverage of what would otherwise be the blind spot with minimal interference with the mirror operation.

The wide angle mirror is formed of a box-like body 15 which is generally wedge-shaped and formed of a suitable molded plastic. The box is provided with elongated side walls 16, a deep end wall 17, a shallow end wall 18 and a curved base 19. The walls and the base are all formed integral in the molding of the box.

The interior edge portions of the walls are rabbeted or thinned to form edge bands or stripes 20 which provide substantially continuous ledges or shoulders 21. These ledges are aligned with the corner forming intersection 23 of the curved base and the shallow end wall 18, which may be either a ledge like ledges 21 or a straight line defining the intersection between the base 19 and the end wall 18.

A thin, rigid, cover plate 25, which preferably is formed of a plastic material, is dropped into the box to cover its open top. The plate is sized to rest upon the ledges so that it is parallel to, but inset or depressed relative to the free edges of the walls. Elongated flanges 24 molded on the thinned edge bands of the opposing walls 16 clamp the plate against the ledges for frictionally fastening the plate within the box.

The molded box is formed of any suitable, commercially available plastic material which has the property of being at least slightly resilient so that it may be flexed sufficiently to spread the flanges apart and thereby permit the plate to be pushed between the flanges. This permits the plate to engage against the ledges so that the flanges, upon resiliently returning to their normal positions, envelope the plate edge portions.

The plate is provided with a relatively thick, resilient plastic pad 26, such as a commercially available, resilient foam plastic material. Preferably the pad is formed from a double faced adhesive coated foam plastic tape. The pad 26 is secured by an adhesive coating 27 to the plate. The opposite face of the pad is provided with a pressure sensitive adhesive coating 28 which is covered with a removable paper or plastic sheet 29, as is conventional, for protecting that type of coating. The pad is partially within the box and partially extended beyond the free edges of the box walls so that the connection between the pad and the plate is protected against weather elements. The pad itself is substantially protected by the box walls.

The particular plastic and adhesive materials may vary, depending upon commercial availability and cost. The selection of the specific materials is not part of this invention, but rather is within the skill of the art.

The plate can be factory assembled into the box or alternatively can be provided as a separate part with the box for consumer assembly, which will substantially reduce cost. In order to assist in the assembly and also to simplify the mounting, the box is provided with a curved corner 32 at its shallow end and the plate is formed with a correspondingly curved corner 33 (see FIG. 2).

When the plate is pushed into the box and frictionally fastened between the ledges and the flanges, the user can manually apply the attachment to his own side view mirror. By removing the cover sheet 29, the pressure sensitive adhesive 28 is exposed. Then, the box is pressed against the mirror surface to compress the pad until the free edges 35 of the walls rest against the side view mirror glass 12. After a suitable period of time to permit the adhesive to set, the mirror is released and a gap 36 (see FIG. 6) appears between the free edges 35 of the walls and the mirror 12.

Because of the gap, vibrations transmitted from the vehicle to the side view mirror are absorbed in the resilient pad, to a considerable extent. In addition, the joints between the pad and the plate and between the pad and the mirror surface 12 are substantially protected against the elements. Moreover, the gap permits the wide angle mirror to be easily pried off the side view mirror if it becomes scratched or damaged in any way.

The exposed curved curved surface 38 of the box base 19 is coated with a suitable reflective coating to produce the wide angle reflective effect. For this purpose, the entire box can be coated, such as through a conventional vacuum metalizing process or dipping process, using commercially available coatings that are commonly used for producing reflective surfaces upon plastic materials. Thus, the surface 38 as well as the exposed wall surfaces are all smooth and unbroken, which enhances the esthetic appearance of the device as well as avoids poor reflection or distracting reflection effects.

Having fully described an operative embodiment of this invention, I now claim:

1. A wide angle mirror for attachment upon a vehicle side view mirror, comprising:

a thin wall, hollow, closed base and open top, plastic molded box formed of walls and a base which are integral to provide a unitary body, and a separate cover for application to the body to cover the open top thereof;

the free edges of the walls all being in a common plane, and elongated ledges formed upon the interior surfaces of the walls at a distance inwardly, i.e., towards the base, from said box edges and being parallel to said box edges;

said cover being formed of a thin plate normally fitted within said walls and engaged with said ledges;

and flanges formed upon the interior surfaces of said walls closely adjacent the plane of the free edges of the walls and spaced from their adjacent ledge portions a distance about equal to the plate thickness so that the plate is frictionally gripped between the ledges and flanges for thereby interlocking the plate within the box;

and said box walls being sufficiently resiliently flexible to flex the flanges apart so that the plate may be manually forced between opposing flanges and into contact with the ledges and thereafter the flange will close over the adjacent edge portion of the plate for thereby assembling the plate to the box body;

and an adhesive coating applied upon the exposed face of the plate, so that the plate may be applied against and adhesively fastened to the mirror surface of a side view mirror for thereby fastening the box thereto;

and the external surface of at least the base being reflective, and the base being curved so that said external face forms a wide angle reflective surface.

2. A device as defined in claim 1, and said adhesive coating being formed upon a resilient pad, which is adhesively secured to the exposed surface of the plate, whereby said resilient pad is interposed between the plate and the side view mirror surface.

3. A device as defined in claim 2, and said plate being depressed inwardly of the box, that is, towards the base thereof, so that its exposed surface is inwardly relative to the plane of the box wall free edges;

and said pad being of sufficient thickness to extend outwardly of the plane of the wall free edges a short distance, so that a substantial portion of the pad is concealed within the box.

4. A device as defined in claim 3, and said box being formed in a generally rectangular shape with two opposed, elongated side walls and two opposed end walls, with all the walls being integral with each other and the base;

and with one of the end walls being considerably deeper than the other, with said base being curved between said end walls so that the box appears to be generally wedge-shaped in its lengthwise direction;

and with said ledge being formed by thinning the edge portion of the two elongated side walls and the deeper end wall to form a substantially continuous shoulder extending parallel to the free edges of the walls along said three walls, and with the line of intersection between the base and the less deep end wall being in planar alignment with said shoulder to form a continuation thereof along the less deep wall;

and said flanges formed of elongated portions, integral with the two side walls and located between the ledge forming shoulders and the free edges of their repsective walls, so that the plate is thereby held inwardly of the plane of the free edges of the walls.

* * * * *